Aug. 21, 1928.  
R. W. SIMPSON  
1,681,503  
DISK WHEEL AND DEMOUNTABLE RIM CONSTRUCTION  
Filed July 27, 1926    2 Sheets-Sheet 1

Inventor  
Robert W. Simpson  
By his Attorneys  
Prindle, Wright, Neal & Bean

Aug. 21, 1928.
R. W. SIMPSON
1,681,503
DISK WHEEL AND DEMOUNTABLE RIM CONSTRUCTION
Filed July 27, 1926    2 Sheets-Sheet 2
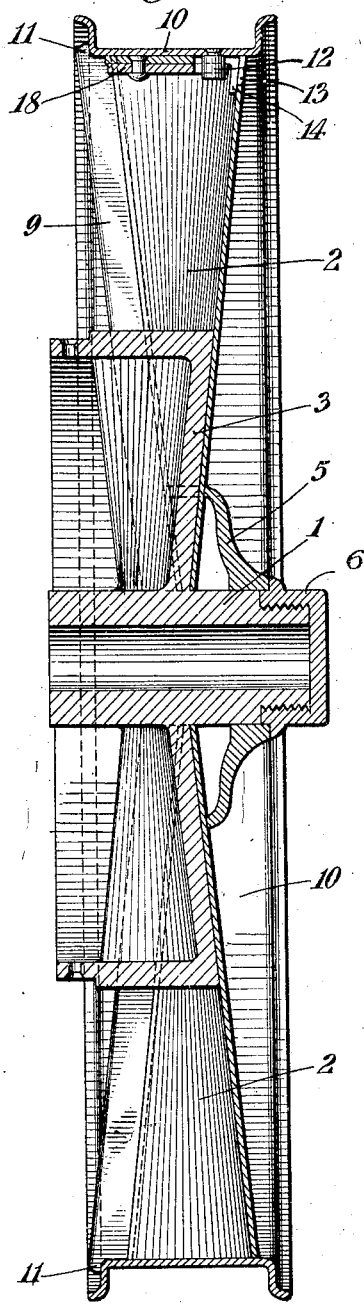
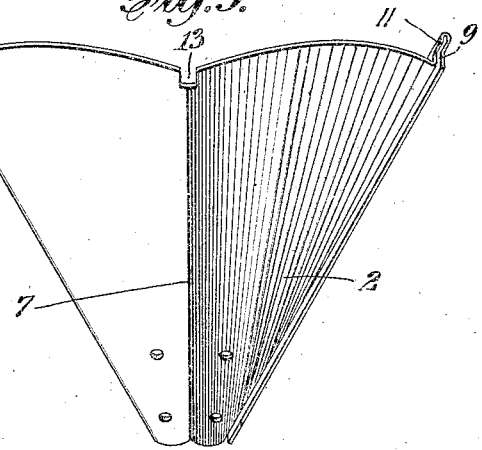
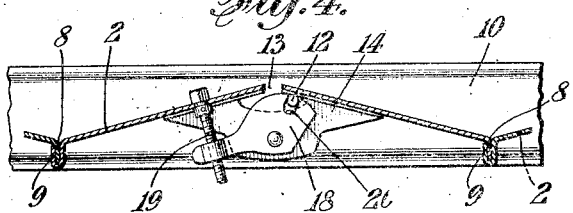
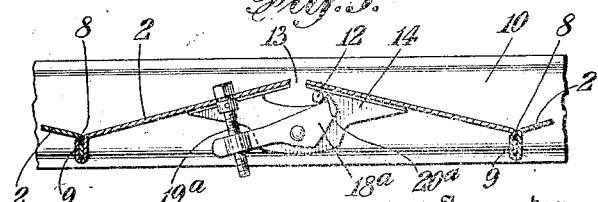

Patented Aug. 21, 1928.

1,681,503

UNITED STATES PATENT OFFICE.

ROBERT W. SIMPSON, OF NEW YORK, N. Y., ASSIGNOR OF ONE-HALF TO EVINA A. KEMP, OF NEW YORK, N. Y.

DISK-WHEEL AND DEMOUNTABLE-RIM CONSTRUCTION.

Application filed July 27, 1926. Serial No. 125,150.

The invention aims to provide a vehicle wheel of the disk type wherein it is insured that the rim will be properly positioned with respect to the disk so as to lie in what may be termed the central plane of the disk, the rim to be securely locked in place against angular or sidewise motion with respect to the disk and yet to be demountable from the disk by simple locking devices which may be readily operated to connect the rim to and disconnect it from the disk.

In certain of its aspects the invention is particularly applicable to a disk wheel of the general type disclosed in the copending application filed in the name of Phillip A. White on May 14, 1925, Serial Number 30,154, entitled "Vehicle wheel," but in its broader aspects the invention is not limited to a wheel of the above type.

Further objects and advantages of the invention will be in part obvious and in part specifically pointed out in the description hereinafter contained which, taken in conjunction with the accompanying drawings, discloses a preferred embodiment thereof; such embodiment, however, is to be considered as merely illustrative of its principles. In the drawings—

Fig. 2 is a central transverse section through such wheel taken on line 2—2 of Fig. 1 looking in the direction of the arrows.

Fig. 3 is a perspective view showing detached one of the sections which make up the disk of the wheel.

Fig. 4 is a detailed section taken on line 4—4 of Fig. 1 looking in the direction of the arrows.

Fig. 5 is a detailed section which may be considered as taken upon either of the lines 5—5 of Fig. 1 looking in the direction of the arrows.

Figure 1:
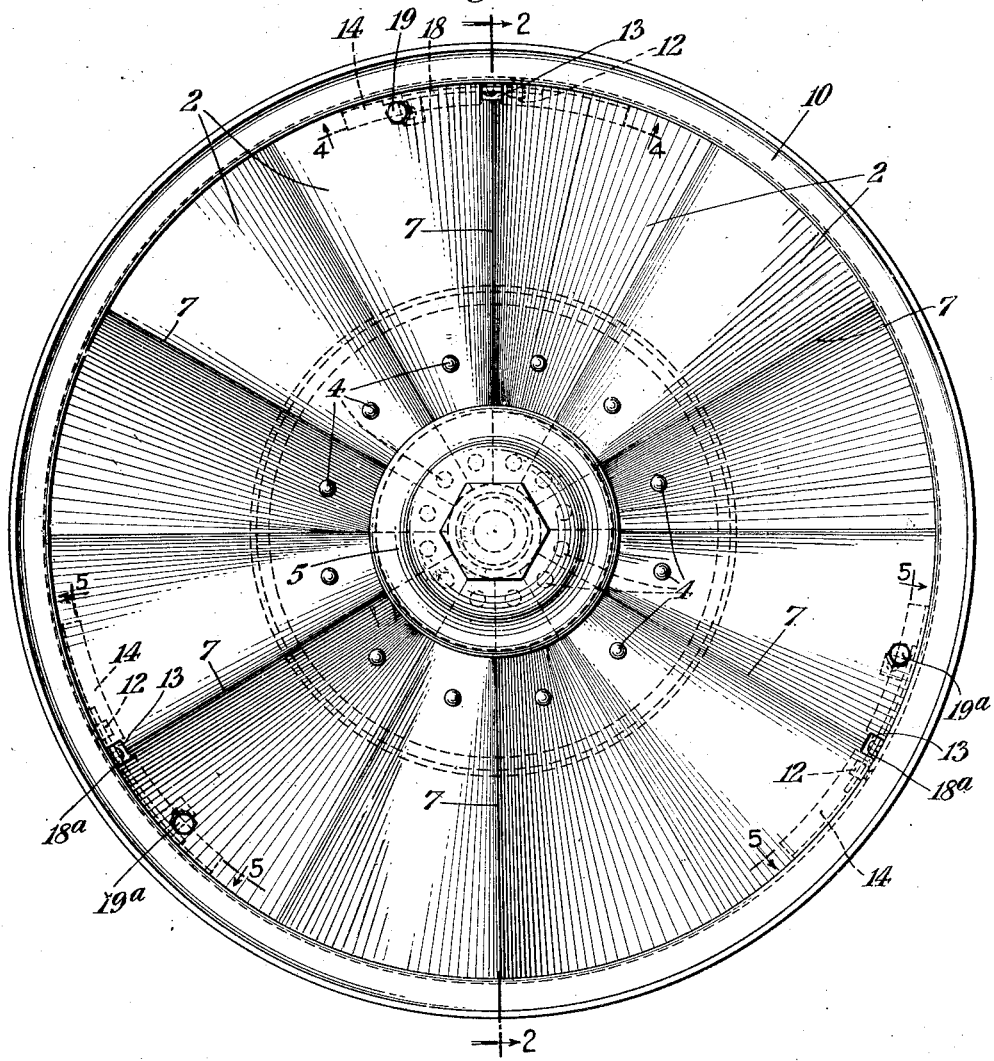
Fig. 1 is a face view of a wheel constructed in accordance with the invention.

The invention is illustrated as applied to a wheel having a hub member 1 to which is secured a disk made up of a plurality of sector-like sections 2 which are suitably secured to the hub at their inner portions. As shown, the hub member is provided with a circular flange 3 upon which the inner portions of the sections lie and to which they are secured as by rivets 4. A fitting 5 may be slid over the hub 1 and held in place in any suitable manner as by a nut 6 shown in Fig. 2.

The disk sections 2 are preferably bent to provide parts running oblique to the plane of the wheel whereby when the several sections are assembled a disk is made up having alternating V-shaped ridges and depressions radiating outwardly to the periphery of the disk, this construction imparting greater strength to the disk and also providing a periphery on the disk having parts which run oblique to the plane of the wheel in zig-zag fashion and serves more adequately to brace the rim of the wheel. As shown each section 2 is bent to form an obtuse angle with its apex 7 substantially at the central line of the section, whereby each section forms a central ridge 7 on one side of the disk with a corresponding depression on the other side, and the adjacent side edges of the disks form similar ridges on the opposite side of the disk, as well as corresponding depressions in the first mentioned side of the disk.

I prefer to provide along the side edges of the sections 2 flanges which serve to strengthen the disk to a substantial extent and also assist in holding the sections in proper relation to each other. As shown, one side edge of each section is provided with a lip 8 and the other side edge is provided with a complementary U-shaped flange 9; thus in assembling the wheel successive sections are laid down around the hub member 1 with flanges 8 and 9 interlocking, the flanges being further secured together by rivets or welding, if desired.

The rim 10 may be supported directly upon the zig-zag peripheral edges of the disk, the disk being provided with lugs which form stops to position the rim properly in the plane of the wheel. As shown, the flanges 9 of the disk sections are provided with radially projecting lugs 11, the flanges being located on the inside of the wheel in such manner that as the rim is forced over the disk from the outer side of the wheel, its side seats against the lugs 11 and keeps the rim in the plane of the wheel.

I also provide locking devices between the rim and disk comprising a cam lever construction permanently associated with the disk and acting upon the rim so as to move the latter angularly with respect to the disk until certain interlocking parts which are provided on the disk and rim, as hereinafter described, have become engaged or disengaged as the case may be. As shown, the rim is provided with a plurality of inwardly projecting pins 12 which register with recesses or slots 13 in the ridges 7 of the disk sections 2 in one angular position of the rim, thus permitting the latter to be mounted on or removed from the disk when the parts are in proper angular relation.

The rim is locked upon the disk by slight angular movement between the above two parts after the pins 12 of the rim have passed through slots 13 above mentioned. As shown, the disk carries a plurality of peripheral shelves or ledges 14, and one of such ledges carries a pivotal cam lever 18 which may be operated by a bolt 19 passing through the disk. The lever 18 has a notch 20 therein which is in alinement with the slot 13 when the rim is placed on the disk and thus by turning bolt 19, lever 18 may be actuated to force the pin 12 out of alinement with slot 13, moving the rim through a small angle in doing so. The engagement between bolt 19 and lever 18 and disk section 2, may be made loose enough to permit lever 18 and bolt 19 to move the necessary amounts without binding.

At the same time the remaining pins 12 on the rim will be turned out of alinement with their corresponding slot 13. I prefer to provide in conjunction with the remaining pins 12 suitable stop members against which the pins may seat when turned angularly by lever 18, as above mentioned. As shown, the remaining ledges 14 each carry pivotal levers 18ª operable by bolts 19ª, similar to members 18 and 19 above described, with the exception that the levers 18ª are provided with shoulders 20ª instead of notches to engage the corresponding pins 12. Thus when bolt 19 is turned to move the rim back to a position where the pins 12 are in alinement with slots 13 to permit removal of the rim, the levers 18ª will not interfere with the backward movement of their corresponding pins 12, but, nevertheless, after bolt 19 has been actuated to lock the rim in position, the bolts 19ª may be turned to seat the shoulders 20ª firmly against the corresponding pins 12, whereby the shoulders 20ª serve to absorb the torsional strains on the rim during the use of the wheel.

While a specific embodiment of the invention has been disclosed it will be obvious that many changes may be made therein without departing from its principles, as defined in the appended claims.

I claim:

1. A vehicle wheel comprising a rim, a disk enclosed thereby having radial strengthening flanges therein, said flanges being extended to form lugs engaging the rim to hold the latter against movement in one direction axially of the wheel, and detachable means for locking the rim in place against said lugs.

2. A vehicle wheel comprising a rim, a disk enclosed thereby, said disk being made up of sector-like sections and each section being shaped to provide sector-like portions running oblique to the plane of the wheel, strengthening flanges being associated with said sections and being provided with lugs engaging the rim to hold the latter against movement in one direction axially of the wheel, and means for detachably locking the rim in place against said lugs.

3. A vehicle wheel comprising a rim having locking pins projecting inwardly therefrom, a disk enclosed by said rim having parts shaped to receive said pins and locking the rim in place upon angular movement of the rim relative to the disk, means carried by said disk for engaging one of said pins to move the rim angularly and lock the latter in position and adjustable stop members carried on the disk adapted to seat against the remaining pins when the rim is in locked position.

4. A vehicle wheel comprising a rim, locking pins projecting inwardly therefrom, a disk enclosed by said rim, said disk having peripheral slots therein adapted to permit the pins to pass through from one side of the disk to the other, and means for moving the rim angularly with respect to the disk to lock said pins out of alinement with said slots.

5. A vehicle wheel comprising a rim, locking pins projecting inwardly therefrom, a disk enclosed by said rim having peripheral slots adapted to permit said pins to pass through the disk from one side to the other, and a lever carried by said disk in position to engage one of said pins when passed through said slot as aforesaid, and move the pin angularly with respect to the slot.

6. A vehicle wheel comprising a rim, locking pins projecting inwardly therefrom, a disk enclosed by said rim having peripheral slots adapted to permit said pins to pass through the disk from one side to the other, a lever carried by said disk in position to engage one of said pins when passed through said slot as aforesaid, and move the pin angularly with respect to the slot, together with stop members carried by said disk adapted to seat against the remaining pins when forced out of alinement with their respective slots.

7. A vehicle wheel comprising a rim, locking pins projecting inwardly therefrom, a disk enclosed by said rim having peripheral slots adapted to permit said pins to pass through the disk from one side to the other, and a lever carried by said disk in position to engage one of said pins when passed through said slot as foresaid, and move the pin angularly with respect to the slot, together with a bolt carried by the disk and engaging the lever to actuate the same.

In testimony that I claim the foregoing, I have hereunto set my hand this 20th day of July, 1926.

ROBERT W. SIMPSON.